(12) United States Patent
Zhuang et al.

(10) Patent No.: US 7,370,657 B2
(45) Date of Patent: May 13, 2008

(54) ACTIVATED CARBON-CONTAINING SORBENT

(75) Inventors: Shuzhong Zhuang, Richmond, VA (US); Jay A Fournier, Richmond, VA (US); John B. Paine, III, Midlothian, VA (US); Lixin Xue, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 253 days.

(21) Appl. No.: 10/404,440

(22) Filed: Apr. 2, 2003

(65) Prior Publication Data

US 2004/0194792 A1    Oct. 7, 2004

(51) Int. Cl.
C01B 31/08    (2006.01)

(52) U.S. Cl. ............... 131/331; 502/417; 502/418
(58) Field of Classification Search ............ 502/416, 502/417, 418, 421, 429, 430, 437; 423/445 R; 131/331
See application file for complete search history.

(56) References Cited

U.S. PATENT DOCUMENTS

| | | | |
|---|---|---|---|
| 2,881,770 A | 4/1959 | Touey | |
| 3,101,723 A | 8/1963 | Seligman et al. | |
| 3,353,543 A | 11/1967 | Sproull et al. | |
| 3,666,526 A * | 5/1972 | Ettinger et al. | 428/312.2 |
| 3,922,334 A * | 11/1975 | Marek et al. | 423/445 R |
| 4,379,465 A | 4/1983 | Coq | |
| 4,412,937 A | 11/1983 | Ikegami et al. | |
| 4,481,958 A | 11/1984 | Rainer et al. | |
| RE32,319 E * | 12/1986 | Korb et al. | 423/445 |
| 4,700,723 A | 10/1987 | Yoshikawa et al. | |
| 4,753,717 A | 6/1988 | Yata et al. | |
| 4,772,508 A | 9/1988 | Brassell | |
| 4,820,681 A | 4/1989 | Chang et al. | |
| 4,917,835 A | 4/1990 | Lear et al. | |
| 4,933,314 A * | 6/1990 | Marumo et al. | 502/416 |
| 5,059,578 A | 10/1991 | Marumo et al. | |
| 5,191,905 A | 3/1993 | Tsukamoto | |
| 5,272,126 A * | 12/1993 | Ichikawa et al. | 502/429 |
| 5,322,075 A | 6/1994 | Deevi et al. | |
| 5,389,325 A | 2/1995 | Bookbinder et al. | |
| 5,482,915 A * | 1/1996 | Golden et al. | 502/417 |
| 5,488,021 A | 1/1996 | DeLiso et al. | |
| 5,510,063 A * | 4/1996 | Gadkaree et al. | 264/29.7 |
| 5,543,096 A | 8/1996 | Wu | |
| 5,568,819 A | 10/1996 | Gentry et al. | |
| 5,591,368 A | 1/1997 | Fleischhauer et al. | |
| 5,632,286 A | 5/1997 | Berget et al. | |
| 5,685,986 A | 11/1997 | Yamada et al. | |
| 5,692,525 A | 12/1997 | Counts et al. | |
| 5,692,526 A | 12/1997 | Adams et al. | |
| 5,732,718 A | 3/1998 | Douglas et al. | |
| 5,744,421 A | 4/1998 | Robinson et al. | |
| 5,820,967 A * | 10/1998 | Gadkaree | 428/116 |
| 5,827,355 A | 10/1998 | Wilson et al. | |
| 5,846,639 A | 12/1998 | Robinson et al. | |
| 5,863,858 A | 1/1999 | Miller et al. | |
| 5,914,294 A | 6/1999 | Park et al. | |
| 5,934,289 A | 8/1999 | Watkins et al. | |
| 5,972,253 A | 10/1999 | Kimber | |
| 6,030,698 A | 2/2000 | Burchell et al. | |
| 6,053,176 A | 4/2000 | Adams et al. | |
| 6,090,362 A * | 7/2000 | Gadkaree | 423/445 R |
| 6,090,477 A | 7/2000 | Burchell et al. | |
| 6,207,264 B1 | 3/2001 | Robinson et al. | |
| 6,214,204 B1 | 4/2001 | Gadkaree et al. | |
| 6,214,758 B1 | 4/2001 | Wu et al. | |
| 6,257,242 B1 | 7/2001 | Stavridis | |
| 6,258,300 B1 | 7/2001 | Burchell et al. | |
| 6,284,705 B1 | 9/2001 | Park et al. | |
| 6,547,990 B2 * | 4/2003 | Shinozaki et al. | 252/502 |

FOREIGN PATENT DOCUMENTS

| | | |
|---|---|---|
| EP | 0 532 329 A1 | 3/1991 |
| EP | 0626199 A1 | 11/1994 |
| WO | WO 03/008068 A | 1/2003 |

OTHER PUBLICATIONS

T. D. Burchell et al., "A Novel Process and Material for the Separation of Carbon Dioxide and Hydrogen Sulfide Gas Mixtures", Pergamon, PII: S0008-6223(97)00077-8, Carbon vol. 35, No. 9. pp. 1279-1294, 1997.

(Continued)

Primary Examiner—Stuart Hendrickson
(74) Attorney, Agent, or Firm—Buchanan Ingersoll & Rooney PC (57) ABSTRACT

An activated carbon-containing sorbent is capable of selectively removing one or more selected gaseous components from a gas. The activated carbon-containing sorbent can be incorporated in a smoking article to remove one or more selected components from mainstream smoke. The activated carbon-containing sorbent can be a composite including one or more molecular sieve materials. Methods of making the activated carbon-containing sorbent, cigarette filters and smoking articles including the activated carbon-containing sorbent, as well as methods for smoking a cigarette comprising the activated carbon-containing sorbent, are provided.

16 Claims, 10 Drawing Sheets

OTHER PUBLICATIONS

T. Burchell et al., "Passive $CO_2$ Removal Using a Carbon Fiber Composite Molecular Sieve", Pergamon, 0196-8904(95)00282-0, Energy Convers. Mgmt. vol. 37, Nos. 6-8, pp. 947-954, 1996.
T. Burchell et al., "A Carbon Fiber Based Monolithic Adsorbent for Gas Separation", Proceedings of 23$^{rd}$ Biennial Conference on Carbon, American Carbon Society, 1997, p. 158.

International Search Report of PCT/IB2004/001323 dated Jul. 21, 2004.
Written Opinion of PCT/IB2004/001323 dated Jul. 21, 2004.
International Preliminary Report on Patentability dated Nov. 1, 2006 for PCT/IB2004/001323.

* cited by examiner

| Sample | Formulation (wt %) | | | | Curing | | Carbonization (@ 850 °C) | | | Activation | | | | BET Surface Area (m²/g) | |
|---|---|---|---|---|---|---|---|---|---|---|---|---|---|---|---|
| | Cured Resin | Uncured Resin | PVA | Zeolite | Temp. (°C) | Time (hr.) | Time (hr.) | % Yield | % Yield from Resin | Time (min.) | Temp. (°C) | $N_2$ Flow Rate (L/min.) | $CO_2$ Flow Rate (L/min.) | % Burn-off | |
| 1 | 70 | 30 | 0 | 0 | 140 | 16 | 2 | 58 | 58 | 60 | 900 | 0.5 | 0.5 | 8 | 636 |
| 2 | 70 | 30 | 0 | 0 | 140 | 16 | 2 | 58 | 58 | 120 | 900 | 0 | 1.0 | 69 | 764 |
| 3 | 50 | 30 | 0 | 20 | 140 | 16 | 2 | 66 | 58 | 120 | 900 | 0 | 1.0 | 17 | 717 |
| 4 | 40 | 30 | 30 | 0 | 140 | 16 | 2 | 47 | 59 | 60 | 900 | 0.5 | 0.5 | 40 | 1105 |
| 5 | 50 | 30 | 10 | 10 | 140 | 16 | 2 | 57 | 59 | 120 | 870 | 0 | 1.0 | 12 | 710 |
| 6 | 55 | 25 | 20 | 0 | | | | 44 | 57 | 45 | 950 | 0.3 | 0.7 | 41 | N/A |

FIG. 14

| Gas Phase Compounds | % Reduction |
|---|---|
| 1,2-propadiene | 11 |
| 1,3-butadiene | 29 |
| isoprene | 41 |
| 1,2-pentadiene | 40 |
| cyclopentadiene | 43 |
| 2,4-hexadiene | 44 |
| 1,3-cyclohexadiene | 49 |
| methyl-1,3-cyclopentadiene | 50 |
| benzene | 48 |
| toluene | 48 |
| p-xylene | 48 |
| m-xylene | 46 |
| o-xylene | 47 |
| styrene (vinylbenzene) | 51 |
| 1-methylpyrrole | 42 |
| formaldehyde | 20 |
| acetaldehyde | 27 |
| acrolein | 52 |
| propionaldehyde | 29 |
| isobutyraldehyde | 44 |
| isovaleraldehyde, 2-methyl | 51 |
| acetone | 40 |
| methyl vinyl ketone | 63 |
| diacetyl | 43 |
| methyl ethyl ketone | 46 |
| methyl propyl ketone | 47 |
| methyl 2-furyl ketone | 47 |
| hydrogen cyanide | 43 |
| acrylonitrile | 75 |

FIG. 15

ACTIVATED CARBON-CONTAINING SORBENT

FIELD OF THE INVENTION

The invention relates to articles and methods for gas filtration. More particularly, the invention relates to activated carbon-containing sorbents, articles containing the sorbents, and methods of making and using the sorbents to filter gases.

BACKGROUND OF THE INVENTION

A number of filter materials have been suggested for use in cigarette filters, including cotton, paper, cellulose, and certain synthetic fibers. However, such filter materials generally only remove particulate and condensable components from tobacco smoke, and thus are not optimal for the removal of gaseous components, such as volatile organic compounds from tobacco smoke.

Cigarettes incorporating filter elements with adsorbent materials, such as carbon, are disclosed, for example, in U.S. Pat. No. 2,881,770 to Tovey; U.S. Pat. No. 3,353,543 to Sproull et al.; U.S. Pat. No. 3,101,723 to Seligman et al.; U.S. Pat. No. 4,481,958 to Ranier et al. and U.S. Pat. No. 5,568,819 to Gentry et al.; and in European Patent Application No. 532,329.

The use of carbon has been described for filtration applications. See, for example, U.S. Pat. Nos. 4,379,465; 4,412,937; 4,700,723; 4,753,717; 4,772,508; 4,820,681; 4,917,835; 4,933,314; 5,059,578; 5,191,905; 5,389,325; 5,510,063; 5,543,096; 5,632,286; 5,685,986; 5,732,718; 5,744,421; 5,820,967; 5,827,355; 5,846,639; 5,914,294; 5,972,253; 6,030,698; 6,090,477; 6,207,264; 6,214,204; 6,257,242 and 6,258,300; and the publications T. D. Burchell et al., "A Novel Process and Material for the Separation of Carbon Dioxide and Hydrogen Sulfide Gas Mixtures", 1997, *Carbon*, 35:1279-94; T. D. Burchell et al., "Passive $CO_2$ Removal Using a Carbon Fiber Composite Molecular Sieve", *Energy Conversion and Management*, 1996, 37:947-54; and T. D. Burchell et al., *Proceedings of 23rd Biennial Conference on Carbon*, American Carbon Society, 1997, p. 158.

Yet, despite these developments, there is a continued interest in improved filters and methods for filtering gases.

SUMMARY OF THE INVENTION

The invention provides sorbents for gas filtration. In a preferred embodiment, the sorbent is an activated carbon-containing sorbent, which can selectively remove at least one selected gaseous component from a gas.

In another preferred embodiment, the sorbent is an activated carbon-containing composite sorbent including activated carbon and at least one molecular sieve material. The molecular sieve material can selectively remove gaseous components from a gas.

A preferred embodiment of a method of making an activated carbon-containing sorbent comprises curing a first resin and reducing the cured first resin into first resin particles. The first resin particles are mixed with an uncured second resin to produce a mixture, which is cured. The cured mixture is carbonized to produce a carbonized body. The carbonized body is activated to produce an activated carbon-containing sorbent.

Another preferred embodiment of a method of making an activated carbon-containing sorbent comprises mixing first resin particles and an uncured second resin with at least one pore-forming substance to produce the mixture. The mixture is cured and carbonized. During activation, the pore-forming substance is removed from the carbonized body by evaporation thereby producing pores in the activated carbon-containing sorbent.

A preferred embodiment of a method of making an activated carbon-containing composite sorbent comprises mixing first resin particles, an uncured second resin and at least one molecular sieve material to produce a mixture. The mixture is cured, carbonized and activated to make the activated carbon-containing composite sorbent.

In a preferred embodiment, a cigarette filter comprises at least one activated carbon-containing sorbent. The cigarette filter can have various constructions and the activated carbon-containing sorbent can selectively be incorporated at one or more locations of the cigarette filter.

In a preferred embodiment, a smoking article comprises at least one activated carbon-containing sorbent capable of selectively removing at least one selected gas-phase component from mainstream smoke.

A preferred embodiment of a method of making a cigarette filter comprises incorporating into a filter construction at least one activated carbon-containing sorbent. The activated carbon-containing sorbent can be incorporated at one or more locations of the cigarette filter.

A preferred embodiment of a method of making a cigarette comprises placing a paper wrapper around a tobacco rod, and attaching a cigarette filter to the tobacco rod to form the cigarette. The cigarette filter includes at least one activated carbon-containing sorbent.

A preferred embodiment of a method of smoking a cigarette comprises heating or lighting the cigarette to form smoke, and drawing the smoke through the cigarette such that at least one activated carbon-containing sorbent in the cigarette removes one or more selected components from mainstream smoke.

DETAILED DESCRIPTION OF PREFERRED EMBODIMENTS

Activated carbon-containing sorbents are provided. The activated carbon-containing sorbents are capable of selectively removing selected gaseous components from a gas flow. The activated carbon-containing sorbents can be used in various applications in which the selective removal of gaseous components from a gas is desired.

In a preferred embodiment, the activated carbon-containing sorbent is a composite, which contains one or more molecular sieve materials. The activated carbon-containing composite sorbent can include one or more molecular sieve materials that have pore structures especially suited for targeted removal of selected gaseous components from gases.

A preferred embodiment of a filter includes an activated carbon-containing sorbent capable of selectively removing one or more selected components from a gas.

A preferred embodiment of a smoking article includes an activated carbon-containing sorbent for filtering selected components from mainstream smoke. The activated carbon-containing sorbent can be a composite.

Preferred embodiments of methods of making activated carbon-containing sorbent and activated carbon-containing composite sorbents are provided.

Preferred embodiments of methods of making filters and smoking articles, and methods of smoking cigarettes including activated carbon-containing sorbent, are also provided.

As used herein, the term "sorption" denotes filtration by adsorption and/or absorption. Sorption is intended to encompass interactions on the outer surface of the sorbent, as well as interactions within the pores and channels of the sorbent. In other words, a "sorbent" is a substance that has the ability to condense or hold molecules of other substances on its surface and/or the ability to take up other substances, i.e., through penetration of the other substances into its inner structure or into its pores. The term "sorbent" as used herein refers to either an adsorbent, an absorbent, or a substance that can function as both an adsorbent and an absorbent. As used herein, the term "remove" refers to adsorption and/or absorption of at least some portion of a gas-phase component, such as a gas-phase component of mainstream tobacco smoke.

The term "mainstream" smoke includes the mixture of gases passing down the tobacco rod and issuing through the filter end, i.e., the amount of smoke issuing or drawn from the mouth end of a smoking article during smoking of the smoking article. The mainstream smoke contains air that is drawn in through both the lit region of the smoking article, as well as through the paper wrapper.

The term "molecular sieve" as used herein refers to a porous structure comprising an inorganic material and/or organic material. Molecular sieves include natural and synthetic materials.

The activated carbon-containing sorbent can have a microporous, mesoporous and/or macroporous pore structure. The term "microporous molecular sieve" generally refers to such material with a pore size of about 20 Å or less. The term "mesoporous molecular sieve" generally refers to such material with a pore size of about 20-500 Å. A "macroporous molecular sieve" is a material with a pore size of about 500 Å or larger. Microporous, mesoporous and/or macroporous molecular sieve materials can be used in preferred embodiments of the activated carbon-containing composite sorbent. The molecular sieve materials used in the activated carbon-containing sorbent can be selected based on the selected component(s) desired to be removed from a gas, such as from mainstream smoke. In another preferred embodiment, the activated carbon-containing sorbent or activated carbon-containing composite sorbent can be used in combination with one or more different molecular sieves.

The activated carbon-containing sorbents and activated carbon-containing composite sorbents can be used in smoking articles including, but not limited to, cigarettes, pipes, cigars and non-traditional cigarettes. Non-traditional cigarettes include, for example, electrically heated cigarettes for electrical smoking systems, such as described in commonly-assigned U.S. Pat. No. 5,692,526; which is incorporated herein by reference in its entirety.

Figure 1:
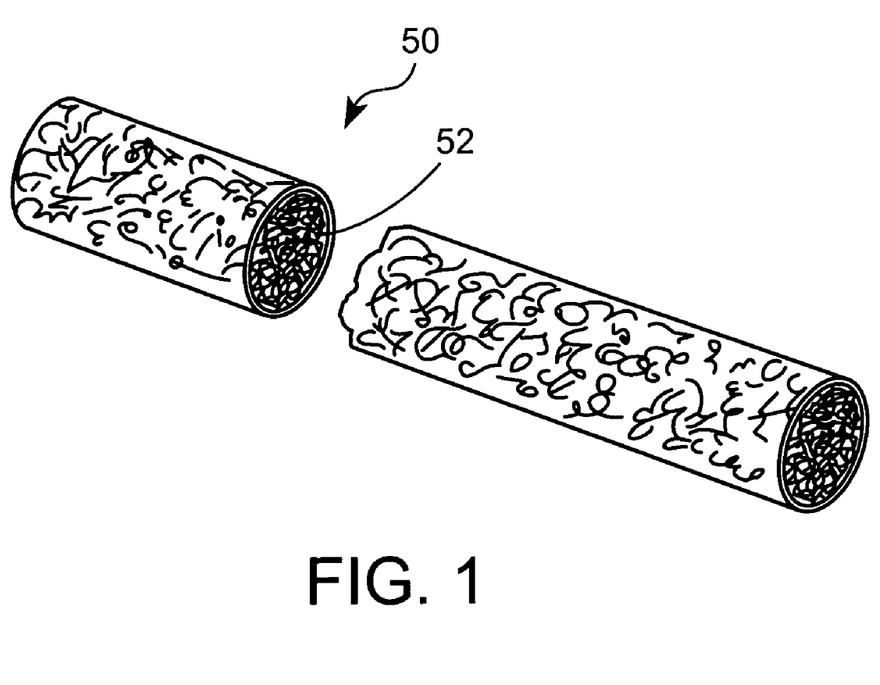
FIG. 1 illustrates an embodiment of a filter element including an activated carbon-containing sorbent.

In preferred embodiments, the activated carbon-containing sorbent is a porous monolithic body. FIG. 1 illustrates a preferred embodiment of a filter element 50 including an activated carbon-containing sorbent 52 in an exemplary form of a porous monolithic body. The activated carbon-containing sorbent 52 can be an activated carbon-containing composite sorbent. The activated carbon-containing sorbent is not limited to any particular shape. It can have a cylindrical shape, such as shown, as well as various other shapes including, for example, oval or polygonal cross-sectional shapes, sheet-like, disk, spherical, honeycomb, or other monolithic shapes.

The activated carbon-containing sorbent 52 can have different sizes. For example, in a preferred embodiment of the activated carbon-containing sorbent used in a cigarette, the sorbent is disk shaped or cylindrical and preferably has a length of at least about 2 mm, and less than about 20 mm, and a diameter preferably slightly less than the diameter of the filter portion of the cigarette. For example, the diameter of the activated carbon-containing sorbent can be slightly less than about 8 mm, which is a typical diameter of a cigarette. In other embodiments in which the activated carbon-containing sorbent is used in a smoking article other than a cigarette, the activated carbon-containing sorbent can have different dimensions depending on the configuration and size of the smoking article. For example, when used in a cigar, the activated carbon-containing sorbent preferably is cylindrical and has a width or diameter slightly less than the width or diameter of the cigar. Alternatively, the activated carbon-containing sorbent can be incorporated in a holder for supporting a cigarette, cigar or other smoking article.

In a preferred embodiment, the activated carbon-containing sorbent is oriented in the smoking article so that the length dimension of the sorbent extends parallel to the length dimension of the smoking article. Such orientation of the activated carbon-containing sorbent increases the length of the flow path through the sorbent traversed by mainstream tobacco smoke, thereby exposing the smoke to an increased surface area of the sorbent. Accordingly, the removal of selected components from the mainstream tobacco smoke by the activated carbon-containing sorbent can be increased. However, increasing the length of the activated carbon-containing sorbent also increases the pressure drop along its length needed to obtain a given gas flow rate through the activated carbon-containing sorbent. Because increasing the pressure drop increases the resistance to draw (RTD) in a smoking article, the length of the activated carbon-containing sorbent preferably is less than about 20 mm to achieve a desirable RTD of the smoking article.

Figure 2:
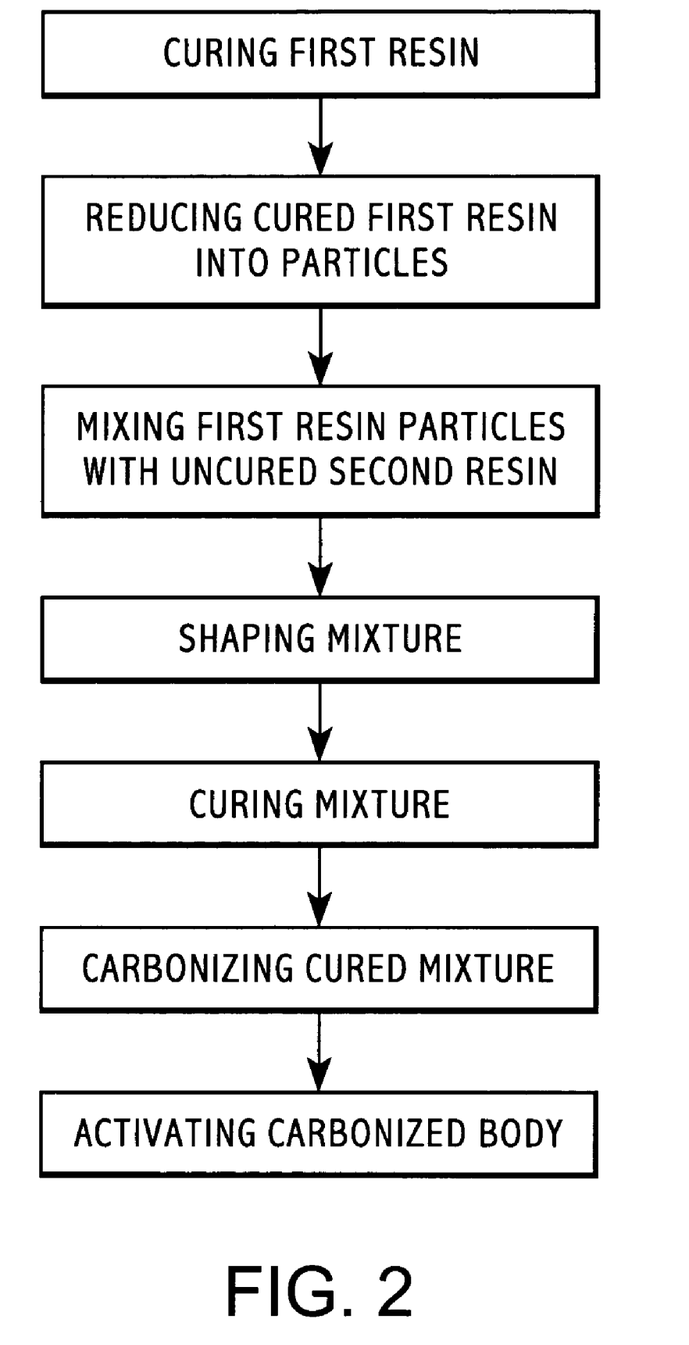
FIG. 2 is a flowchart depicting a first embodiment of a method of making an activated carbon-containing sorbent.

FIG. 2 shows steps of a first preferred embodiment of a method of making an activated carbon-containing sorbent. In this embodiment, a first resin is cured to cross-link the resin and produce a cured material. The cured material is mixed with an uncured second resin to produce a mixture. The mixture is cured by heating, followed by carbonizing and activating steps to produce an activated carbon-containing sorbent. It has been determined that performing the two curing steps prior to carbonization enables the production of a shaped activated carbon-containing article. It has further been determined that direct carbonization of a pre-shaped resin body does not produce a satisfactory shaped activated carbon-containing article because during carbonization the resin melts and goes through a liquid phase before reaching the curing temperature. Preferred embodiments of methods of making the activated carbon-containing sorbent overcome this problem and can provide sorbents having desired shapes.

In the embodiment depicted in FIG. 2, the first resin is preferably a phenolic resin. The phenolic resin can be a resole-type, self-curing phenolic resin; a novolak-type phenolic resin, which is combined with a curing agent that promotes cross-linking; or a mixture of one or more resole-type phenolic resins and/or one or more novolak-type phenolic resins. The curing agent used with the novolak-type phenolic resin can be, for example, hexamethylenetetramine, ethylenediamine-formaldehyde products, anhydro-formaldehyde-aniline, methylol derivatives of urea or melamine, paraformaldehyde and the like. The first resin can be carbonized by heating, as described below. The first resin is preferably entirely in powder form.

The curing temperature of the first resin is selected based on factors including the resin composition and the curing time. For example, phenolic resin can be cured in air or another suitable atmosphere at a preferred temperature of from about 120° C. to about 160° C., and more preferably from about 140° C. to about 150° C. The curing time of phenolic resin decreases as the curing temperature is increased. During curing, the first resin can be contained in a suitable vessel, such as a ceramic crucible, or the like.

The cured first resin is a solid mass. The solid mass of the cured first resin is reduced to particle form by any suitable process that produces particles of desired size. The cured first resin is preferably reduced by a mechanical impaction technique, such as milling (for example, jet milling) or crushing to produce particles. In a preferred embodiment, the cured first resin particles have a particle size of from about 5 microns to about 100 microns, and more preferably from about 10 microns to about 30 microns.

The cured first resin particles can optionally be sized to provide a desired particle size distribution. For example, the cured first resin particles can be screened, air classified, or the like, to achieve a desired particle size distribution.

In the embodiment, the cured first resin particles of the desired size are mixed with an uncured second resin. The uncured second resin can be the same resin as the first resin used to produce the cured resin particles, or the uncured second resin can be a different resin. If the uncured second resin contains a novolak-type phenolic resin, a curing agent that promotes cross-linking of this resin is also added to the mixture.

The uncured second resin preferably is in powder form and preferably has a particle size (for example, average particle size or particle size distribution) that approximates that of the cured first resin particles. By combining approximately equally sized, cured first resin particles and uncured second resin particles, the uniformity of the mixture of the particles can be enhanced.

In the embodiment, the mixing ratio of the cured first resin particles to the uncured second resin is preferably selected to promote bonding of the cured and uncured particles. Preferably, the amount of the uncured second resin in the mixture is selected to achieve sufficient bonding of the cured first resin particles to each other so that the shape of the cured mixture can be maintained. In a preferred embodiment, the ratio by weight of the cured resin to the uncured resin is from about 80:20 to about 60:40.

As described below, the mixture can include other components in addition to the cured first resin and uncured second resin. Such other components can include pore-forming materials and/or molecular sieve materials. In such embodiments, the relative amounts of the cured first resin and the uncured second resin are selected based on the amount(s) of the one or more other components that are added to the mixture.

In a preferred embodiment, the mixture of cured first resin particles and uncured second resin particles (and other optional component(s)) is shaped into a desired shape. For example, the mixture can be shaped by compaction, molding, extrusion, or the like. In a preferred embodiment, the mixture is placed in a vessel, or in a cavity of a mold or die, having a desired shape and size, which corresponds approximately to the desired shape and size of the activated carbon-containing sorbent. For example, the vessel or cavity can be cylindrical, polygonal, or disk shaped. The vessel, mold or die can be configured to produce a plurality of shaped bodies simultaneously.

Optionally, the mixture of the cured first resin and the uncured second resin can be shaped by applying pressure to the mixture. For example, when the mixture is contained in a cavity of a mold or die, pressure can be applied to the mixture using a movable punch to increase its packing density. In other preferred embodiments, the mixture is not subjected to pressure to further shape the mixture or increase its packing density. In such embodiments, the mixture can be loosely filled in a cavity of a mold or die, or other vessel.

In the embodiment, the mixture is then cured. During curing, the mixture can be placed in air or another suitable atmosphere at a preferred temperature of from about 120° C. to about 160° C., and more preferably from about 140° C. to about 150° C. Curing is preferably conducted at a lower temperature and for a longer curing time than the temperature and time conditions used to cure the first resin. By using a lower curing temperature and longer curing time for curing the mixture, the mixture is cured slowly and the shape of the mixture can be substantially retained during curing. The final curing temperature can be reached slowly to minimize distortion of the body. For example, the mixture can be heated at a first temperature less than the final curing temperature for a selected period of time, and then heated to the final curing temperature and held at that temperature for a selected amount of time. The curing of the mixture produces a cured monolith having a desired pre-shape.

In the embodiment, the cured monolith is carbonized. During carbonization, the cured monolith is heated at a selected elevated temperature and for an effective amount of time to sufficiently carbonize the mixture to produce a carbonized body. For example, the mixture can be heated at a temperature of from about 700° C. to about 1000° C. for a period of from about 1 hour to about 20 hours in an inert or reducing atmosphere to carbonize the first and second resins in the mixture. The gas atmosphere can contain, for example, nitrogen and/or argon. Preferably, the carbonizing atmosphere does not contain oxygen because oxygen will react with carbon and remove material from the carbonized body. Typically, the percent yield of the first and second resins (i.e., percent yield=(100)×(final weight of carbonized body after carbonization/initial weight of monolith before carbonization)) is at least about 55%. Typically, the carbonized body produced from the cured monolith contains at least about 95% carbon, and preferably consists essentially of carbon. In some embodiments, small amounts of H, N, O and/or trace metals may be present in the carbonized body.

In the embodiment, the carbonized body is then activated to develop a desired pore structure in the activated body. Activation can be conducted, for example, in an oxygen-containing atmosphere, such as in steam, carbon dioxide, oxygen, or mixtures thereof. Oxygen in the atmosphere reacts with carbon, thereby removing carbon from the carbonized body and producing pores. In a preferred embodiment, activation is conducted at a temperature of from about 800° C. to about 1000° C., and for a period of from about 30 minutes to about 5 hours.

In a preferred embodiment, the carbonized body is activated to achieve a desired "percent burn-off", which represents the weight loss of the carbonized body that occurs during activation [i.e., percent burn-off=(100)×(initial weight before activation−final weight after activation)/initial weight before activation]. As the percent burn-off is increased, the pore surface area increases. In a preferred embodiment, the BET (Brunauer, Emmett and Teller) surface area of the activated carbon-containing sorbent after activation is from about 500 $m^2/g$ to about 1,500 $m^2/g$.

Increasing the burn-off of carbon reduces the compressive strength of the activated carbon-containing sorbent. Accordingly, the burn-off preferably is controlled to produce an activated carbon-containing sorbent that has a desirable combination of carbon surface area and compressive strength, to thereby provide suitable filtration performance characteristics and mechanical strength.

Burn-off can be controlled to control the pore size, pore volume and density of the activated carbon-containing sorbent, and thus the capacity of the carbon-containing sorbent to remove selected gas-phase components. For example, one or more of the activation atmosphere, activation gas flow rate, activation temperature and activation time can be varied to control the pore structure of the activated carbon-containing sorbent.

Figure 3:
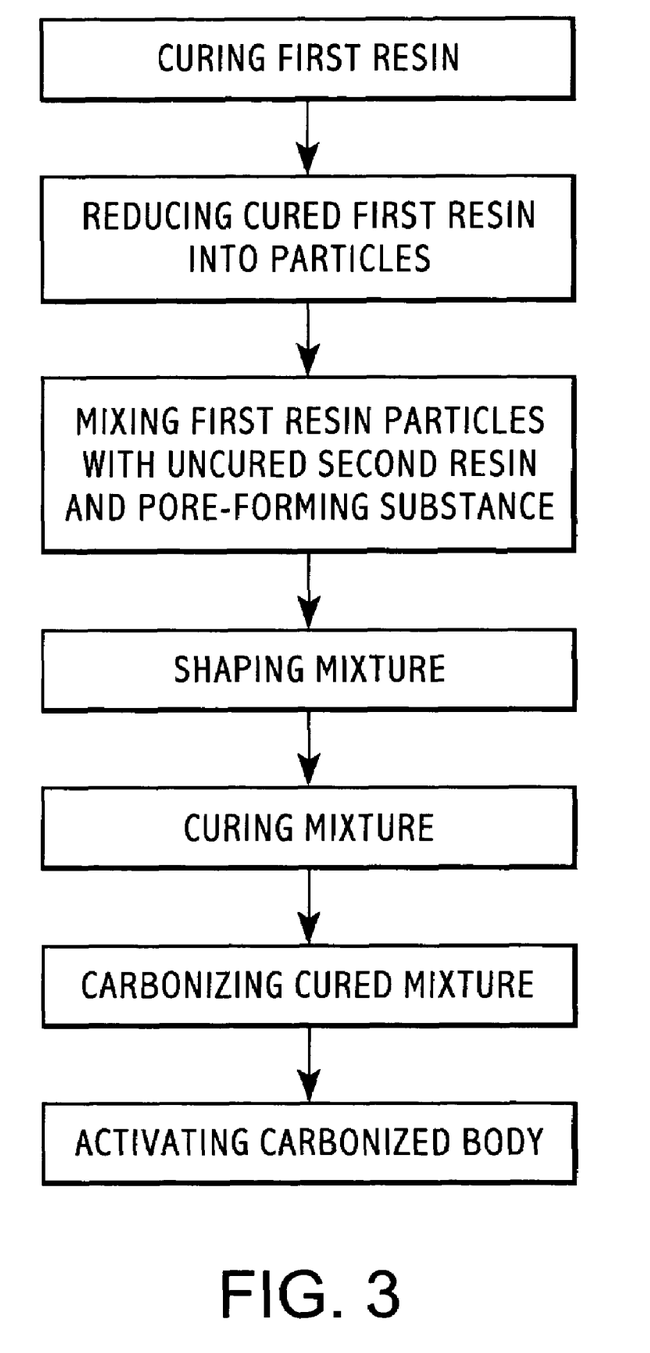
FIG. 3 is a flowchart depicting a second embodiment of a method of making an activated carbon-containing sorbent.

FIG. 3 depicts a second preferred embodiment of a method of making an activated carbon-containing sorbent. In this embodiment, at least one pore-forming substance is added to the mixture of the cured first resin and the uncured second resin. In a preferred embodiment, the cured first resin and uncured second resin are in particle form. In this embodiment, the above-described shaping, curing, carbonizing and activating steps of the first embodiment depicted in FIG. 2 are preferably then performed to produce an activated carbon-containing sorbent.

The pore-forming substance is added to the mixture of the cured first resin and uncured second resin to produce macropores in the activated carbon-containing sorbent. Macropores provide a path for adsorbate molecules to reach the interior of adsorbent particles. The geometry, size and amount of macropores can significantly affect sorption, especially in filtration processes in which adsorbate molecules move rapidly through a sorbent, such as in a cigarette smoking process.

The pore-forming substance added to the mixture decomposes at elevated temperatures used during carbonization. Preferably, the pore-forming substance leaves substantially no residue upon thermal decomposition during carbonization. The pore-forming substance can have any suitable form, such as, for example, particles, beads and/or fibers. The pore-forming substance can be in the form of long fibers, which decompose to form straight channels in the activated carbon-containing sorbent. Such channels can have a desired size, shape and number that provides a selected gas permeability in the activated carbon-containing sorbent.

Suitable pore-forming substances include, but are not limited to, poly(vinylalcohol) (PVA), polypropylene and the like. The amount of the pore-forming substance added to the mixture of the cured first resin and the uncured second resin can be selected to provide a desired pore volume resulting from decomposition of the pore-forming substance during carbonization. In a preferred embodiment, the mixture including the cured first resin, uncured second resin and the pore-forming substance contains an effective amount, such as about 10 wt % to about 30 wt %, of the pore-forming substance.

In a preferred embodiment, the mixture containing the cured first resin, uncured second resin and pore-forming substance is cured below the melting temperature of the pore-forming substance so that the pore-forming substance does not melt during curing, but melts and decomposes during subsequent carbonization.

The activated carbon-containing sorbent produced by methods according to the second embodiment can provide a controlled pore structure, including a controlled amount and size of pores produced by activating the carbonized body, and controlled macropores produced by decomposing the pore-forming substance during carbonization. In addition, the activated carbon-containing sorbent can have a controlled apparent density. The activated carbon-containing sorbent can provide a selected resistance to draw when incorporated in a smoking article.

Figure 4:
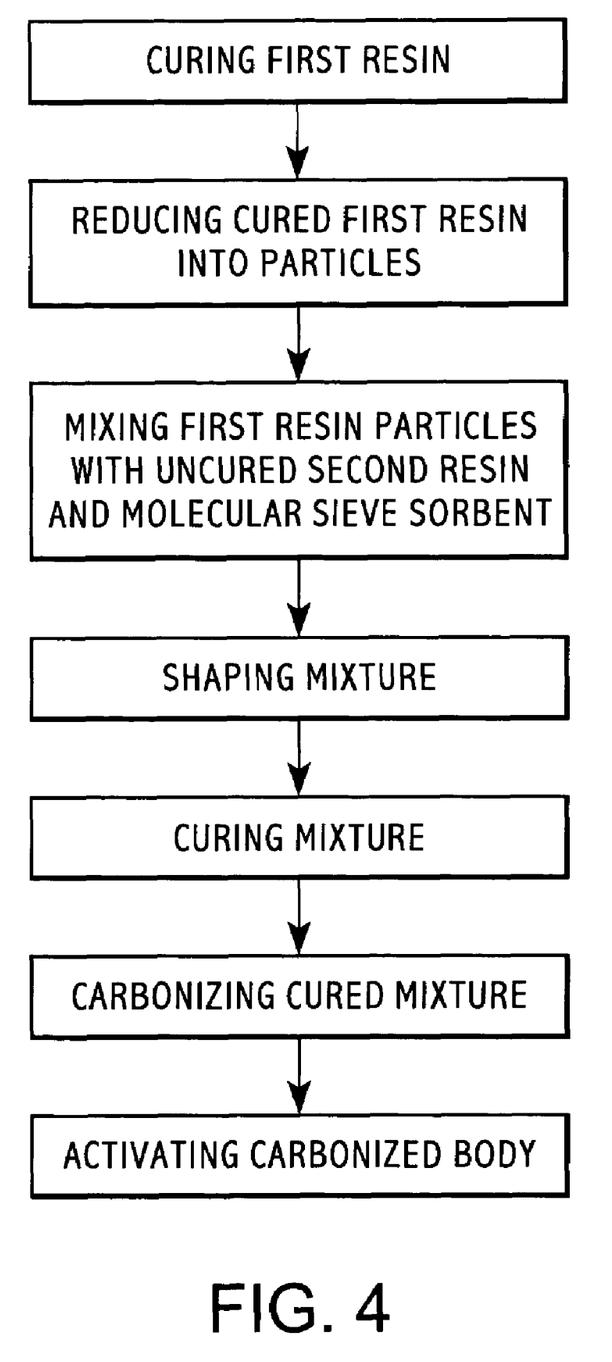
FIG. 4 is a flowchart depicting a third embodiment of a method of making an activated carbon-containing sorbent.

FIG. 4 shows steps of a third preferred embodiment of a method of making an activated carbon-containing composite sorbent. In this embodiment, at least one molecular sieve material is added to the mixture of the cured first resin and the uncured second resin described above with respect to the first preferred embodiment depicted in FIG. 2. The cured first resin and uncured second resin are preferably in particle form. In this embodiment, the above-described shaping, curing, carbonizing and activating steps of the first embodiment preferably are then performed to produce an activated carbon-containing composite sorbent including the molecular sieve material from the precursor mixture.

The molecular sieve material is added to the mixture of the cured first resin and uncured second resin to produce pores and channels in the activated carbon-containing composite sorbent. The molecular sieve material can be any suitable material. In a preferred embodiment, the molecular sieve material is one or more zeolites. Zeolites include crystalline aluminosilicates, which have channels or pores of uniform, molecular sized dimensions. There are many known unique zeolite structures having different sized and shaped channels or pores. The size and shape of the channels or pores can significantly affect the properties of these materials with regard to sorption and separation processes. Molecules can be separated by zeolites by size and shape effects related to the possible orientation of the molecules in the channels or pores, and/or by differences in strength of sorption. One or more zeolites having channels or pores larger than one or more selected components of mainstream smoke can be used in the activated carbon-containing composite sorbent, such that only selected molecules that are small enough to pass through the pores of the molecular sieve material are able to enter the cavities and be sorbed on the zeolite.

Suitable zeolite materials that can be used as the molecular sieve material, include, but are not limited to, one or more of zeolite A; zeolite X; zeolite Y; zeolite K-G; zeolite ZK-5; zeolite BETA; zeolite ZK-4 and zeolite ZSM-5. Zeolites can be incorporated in the tobacco rod of smoking articles also.

Other molecular sieve sorbents that may be used in the activated carbon-containing composite sorbent include, but are not limited to, one or more of mesoporous silicates, alumino phosphates, and other related porous materials, such as mixed oxide gels, which may optionally further comprise inorganic or organic ions and/or metals. Microporous, mesoporous and/or macroporous molecular sieves may be used, depending on the selected gas-phase component(s) that are preferably removed from a gas. In a preferred embodiment, the mixture including the cured first resin and uncured second resin contains an effective amount, such as about 10 wt % to about 30 wt %, of the molecular sieve material.

The activated carbon-containing composite sorbent produced by methods according to the third preferred embodiment has a controlled pore structure, including a controlled volume and size of pores provided by activation of the carbonized body, and pores and channels of a selected size and amount provided by the molecular sieve material.

Figure 5:
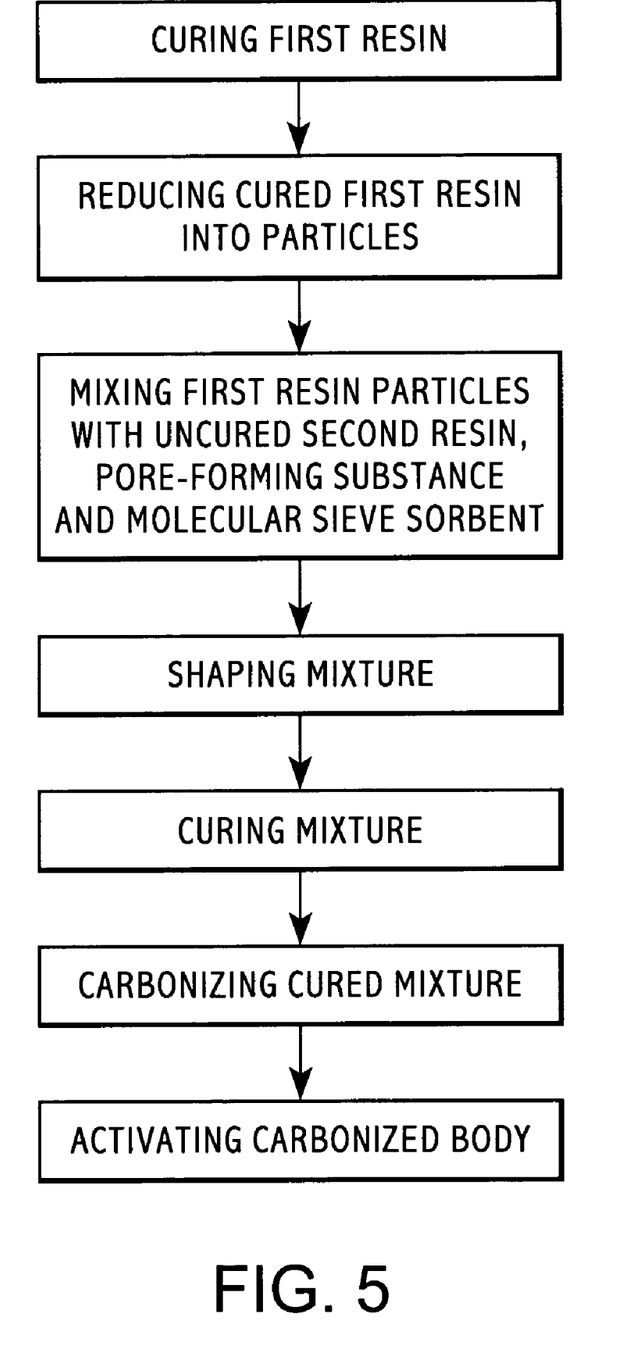
FIG. 5 is a flowchart depicting a fourth embodiment of a method of making an activated carbon-containing sorbent.

FIG. 5 shows steps of a fourth preferred embodiment of a method of making an activated carbon-containing composite sorbent. In this embodiment, at least one pore-forming substance and at least one molecular sieve material are added to the mixture of the cured first resin and the uncured second resin described above with respect to the first preferred embodiment. The cured first resin and the uncured second resin are preferably in particle form. In this embodiment, the shaping, curing, carbonizing and activating steps described above with respect to the first preferred embodiment preferably are then performed to produce an activated carbon-containing composite sorbent including the molecular sieve material from the precursor mixture.

The mixture including the cured first resin and uncured second resin contains an effective amount of the pore-forming substance, such as from about 5 wt % to about 15 wt %, and from about 5 wt % to about 15 wt % of the molecular sieve material.

Activated carbon-containing composite sorbents produced by methods according to the fourth preferred embodiment can provide a controlled pore structure, including a controlled amount and size of pores produced by activating the carbonized body; controlled macropores and tortuosity produced by decomposition of the pore-forming substance during carbonization; and pores provided by the molecular sieve material. Preferred embodiments of the activated carbon-containing composite sorbent can provide a desired RTD when incorporated in a smoking article.

In any of the preferred embodiments of methods of making the activated carbon-containing sorbent described above, a plurality of separate monolithic bodies can be simultaneously produced. For example, from two to several hundred monolithic bodies can be produced simultaneously by such methods.

The pores of the activated carbon-containing sorbent preferably are larger than the molecules of one or more selected components of mainstream tobacco smoke that are desired to be removed. Only those components of the mainstream tobacco smoke that are small enough to enter into the pores of the activated carbon-containing sorbent and channels and/or pores of the molecular sieve material can be adsorbed on the interior surface of the pores. Thus, components of mainstream tobacco smoke having small molecular structures are selectively sorbed by the activated carbon-containing sorbent, while larger components, such as those contributing to flavor, remain in the smoke. In a preferred embodiment, the average pore size of the activated carbon-containing sorbent is less than about 20 Å, and more preferably less than about 15 Å.

As described above, the pore size of the activated carbon-containing sorbent can be modified or adjusted in the process by controlling the percentage burn-off during activation of the carbon. In preferred embodiments, the activated carbon-containing sorbent (which may contain one or more molecular sieve materials) may be manufactured to selectively remove one or more components including, but not limited to, 1,2-propadiene, 1,3-butadiene, isoprene, 1,2-pentadiene, 1,3-cyclopentadiene, 2,4-hexadiene, 1,3-cyclohexadiene, methyl-1,3-cyclopentadiene, benzene, toluene, p-xylene, m-xylene, o-xylene, styrene (vinylbenzene), 1-methylpyrrole, formaldehyde, acetaldehyde, acrolein, propionaldehyde, isobutyraldehyde, 2-methyl isovaleraldehyde, acetone, methyl vinyl ketone, diacetyl, methyl ethyl ketone, methyl propyl ketone, methyl 2-furyl ketone, hydrogen cyanide and acrylonitrile.

In a preferred embodiment, the activated carbon-containing sorbent in monolith form is incorporated in the filter portion of a smoking article. In the filter portion, the activated carbon-containing sorbent can be incorporated, for example, with paper, fibers and the like; incorporated in place of a filter component; and/or incorporated in a space and/or void. For example, paper can be folded paper inserted into a hollow portion of the cigarette filter. The paper is preferably in the form of a sheet material, such as crepe paper, filter paper or tipping paper. However, other suitable materials, such as organic or inorganic cigarette compatible materials can also be used. The activated carbon-containing sorbent can be incorporated at one or more locations in the filter portion.

The activated carbon-containing sorbent can optionally be incorporated in the tobacco of smoking articles. For example, in a cigarette or cigar, the activated carbon-containing sorbent in monolith form can be located in the tobacco rod. The activated carbon-containing sorbent in the tobacco preferably has a configuration and pore structure that provides a minimal RTD and minimally interferes with the combustion process.

The activated carbon-containing sorbent can be used in various filter constructions. Exemplary filter constructions include, but are not limited to, a mono filter, a dual filter, a triple filter, a cavity filter, a recessed filter or a free-flow filter. Mono filters typically contain cellulose acetate tow or cellulose paper. Pure mono cellulose filters or paper filters offer good tar and nicotine retention, and are highly biodegradable. Dual filters typically comprise a cellulose acetate mouth side plug and a pure cellulose segment or cellulose acetate segment. The length and pressure drop of the two segments of the dual filter can be adjusted to provide optimal adsorption, while maintaining acceptable draw resistance. Triple filters can include mouth and smoking material or tobacco side segments, while the middle segment comprises a material or paper. Cavity filters typically include two segments, e.g., acetate-acetate, acetate-paper or paper-paper, separated by a cavity containing the activated carbon-containing sorbent. Recessed filters include an open cavity on the mouth side, and can typically incorporate the activated carbon-containing sorbent into a space of the plug material. The filters may also optionally be ventilated, and/or comprise additional sorbents (such as charcoal or magnesium silicate), catalysts, flavorants, and/or other additives.

FIGS. 6-13 illustrate cigarettes 2 including different filter constructions in which the activated carbon-containing sorbent can be incorporated. In each of these embodiments, a desired amount of the activated carbon-containing sorbent can be placed in the cigarette filter portion by varying the size and/or density of the activated carbon-containing sorbent, or by incorporating more than one activated carbon-containing sorbent.

Figure 6:
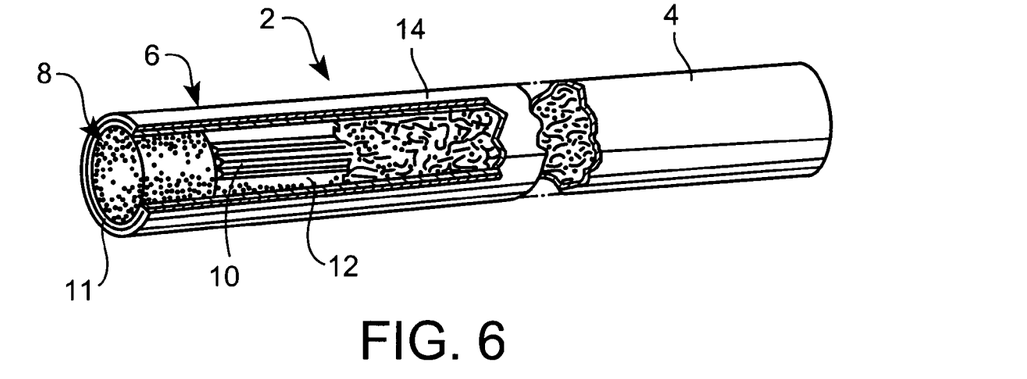
FIG. 6 illustrates a cigarette including an embodiment of a filter portion having a tubular filter element.

FIG. 6 illustrates a cigarette 2 including a tobacco rod 4, a filter portion 6, and a mouthpiece filter plug 8. The activated carbon-containing sorbent can be incorporated with the folded paper 10, which is disposed in the hollow interior of a free-flow sleeve 12 forming part of the filter portion 6.

The activated carbon-containing sorbent can be configured as an annular, free-flow monolith and incorporated in place of any of the free-flow sleeves of filters described herein.

Figure 7:
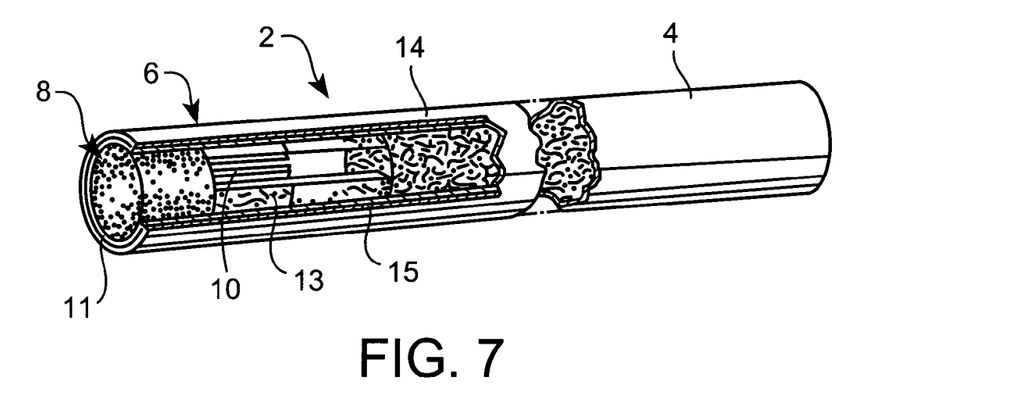
FIG. 7 illustrates a cigarette including another embodiment of the filter portion.

FIG. 7 depicts a cigarette 2 including a tobacco rod 4 and a filter portion 6. Paper 10 is disposed in the hollow cavity of a first free-flow sleeve 13 located between the mouthpiece filter plug 8 and a second free-flow sleeve 15. The paper 10 can have different forms, including folded, one or more individual strips, a wound roll, or the like. In the cigarettes shown in FIGS. 6 and 7, the tobacco rod 4 and the filter portion 6 are joined together with tipping paper 14. In both cigarettes, the filter portion 6 may be held together by filter overwrap 11. In this embodiment, the activated carbon-containing sorbent in monolith form can be incorporated into the filter portion of the cigarette, such as in the paper 10 of the first free-flow sleeve 13, or in place of, or as part of, the second free-flow sleeve 15.

Figure 8:
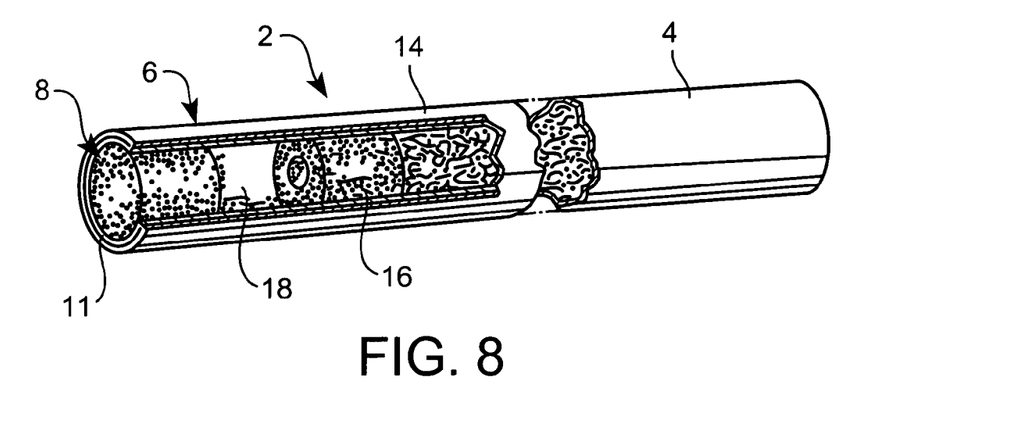
FIG. 8 illustrates a cigarette including a further embodiment of the filter portion having a plug-space-plug filter element.

In another preferred embodiment, the activated carbon-containing sorbent in monolith form is incorporated with the fibrous material of the cigarette filter portion itself. Such fibrous filter materials include, but are not limited to, paper, cellulose acetate fibers and polypropylene fibers. Such embodiment is depicted in FIG. 8, which shows a cigarette 2 including a tobacco rod 4 and a filter portion 6 in the form of a plug-space-plug filter including a mouthpiece filter plug 8, plug 16 and space 18. The plug 16 can comprise a tube or solid piece of material, such as polypropylene or cellulose acetate fibers. The tobacco rod 4 and the filter portion 6 are joined together with tipping paper 14. The filter portion 6 can include a filter overwrap 11. The activated carbon-containing sorbent can be incorporated, for example, in place of, or as part of, the plug 16, and/or in the space 18.

Figure 9:
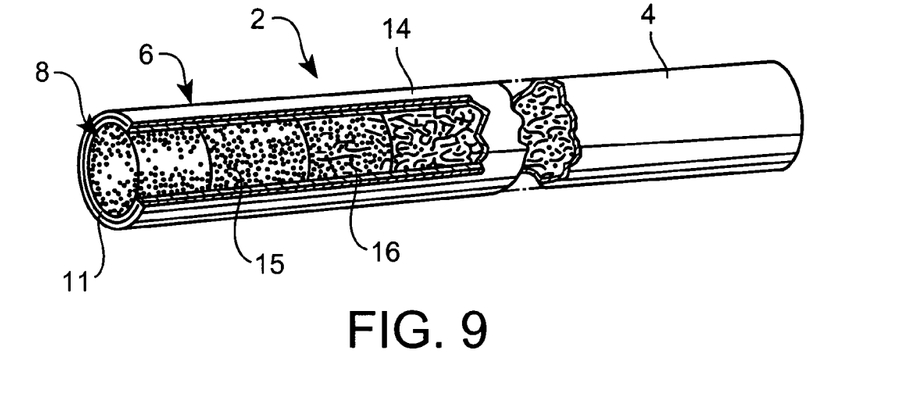
FIG. 9 illustrates a cigarette including yet another embodiment of the filter portion having a three-piece filter element.

FIG. 9 shows a cigarette 2 including a tobacco rod 4 and filter portion 6. This embodiment is similar to the cigarette of FIG. 8 except the space 18 contains a monolithic activated carbon-containing sorbent 15. The tobacco rod 4 and filter portion 6 are joined together with tipping paper 14. The cigarette also includes a filter overwrap 11. In this embodiment, the activated carbon-containing sorbent in monolith form can be incorporated, for example, in place of, or as part of, the plug 15, and/or the plug 16.

Figure 10:
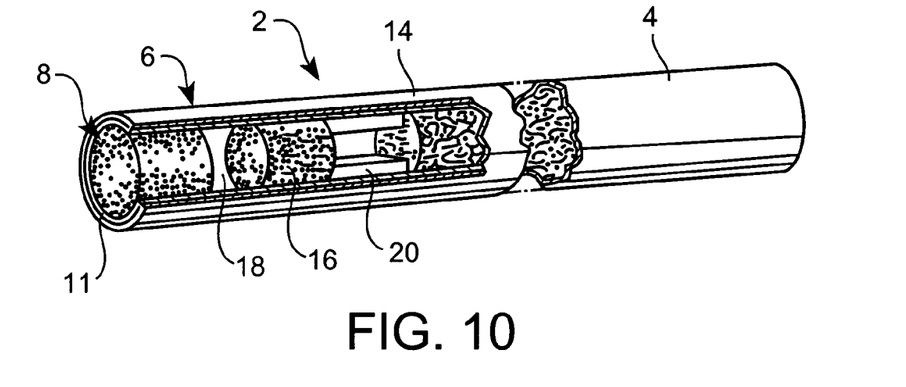
FIG. 10 illustrates a cigarette including another embodiment of the filter portion having a four-piece filter element with a plug-space-plug arrangement and a hollow sleeve.

FIG. 10 shows a cigarette 2 including a tobacco rod 4 and a filter portion 6. The filter portion 6 includes a mouthpiece filter 8, filter overwrap 11, tipping paper 14 joining the tobacco rod 4 and filter portion 6, space 18, a plug 16 and hollow sleeve 20. The activated carbon-containing sorbent in monolith form can be incorporated at one or more locations in the filter portion 6, such as in the space 18, and/or in place of, or as part of, the plug 16 and/or the hollow sleeve 20.

Figure 11:
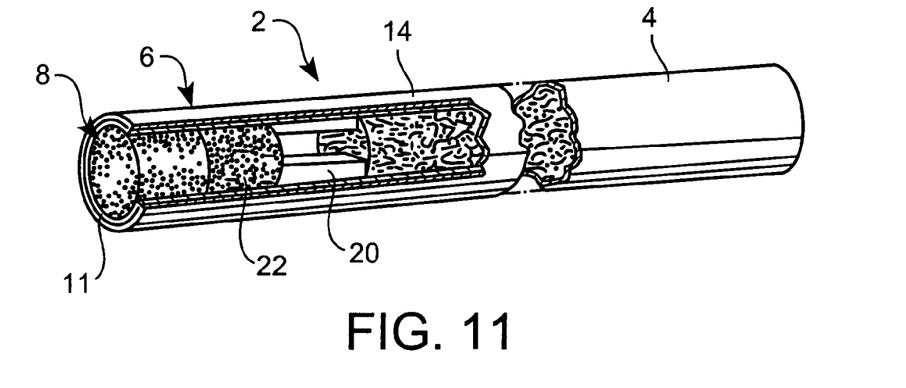
FIG. 11 illustrates a cigarette including a further embodiment of the filter portion having a three-part filter element with two plugs and a hollow sleeve.
Figure 12:
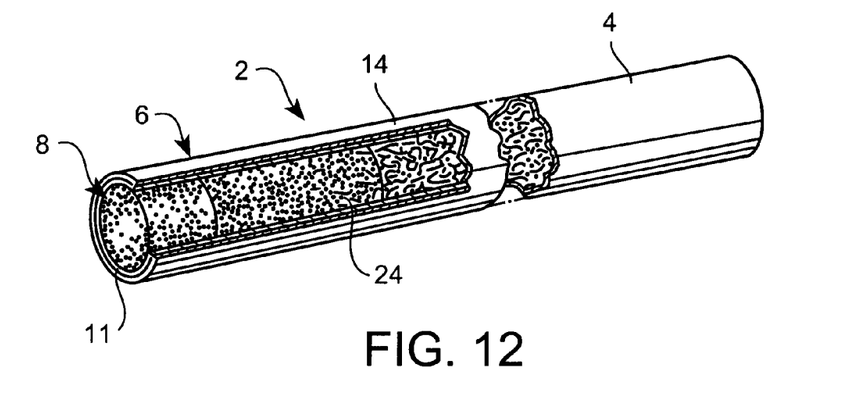
FIG. 12 illustrates a cigarette including yet another embodiment of the filter portion having a two-part filter element with two plugs.

FIGS. 11 and 12 show further embodiments of the filter portion 6. In the embodiment depicted in FIG. 11, the cigarette 2 includes a tobacco rod 4 and filter portion 6. The filter portion 6 includes a mouthpiece filter plug 8, filter overwrap 11, plug 22 and hollow sleeve 20. The tobacco rod 4 and filter portion 6 are joined together by tipping paper 14. In this embodiment, the monolithic activated carbon-containing sorbent can be incorporated at one or more locations, such as in place of, or as part of, the plug 22 and/or the sleeve 20.

In the embodiment shown in FIG. 12, the filter portion 6 includes a mouthpiece filter plug 8 and a plug 24. The tobacco rod 4 and filter portion 6 are joined together by tipping paper 14. The activated carbon-containing sorbent in monolith form can be incorporated in place of, or as part of, the plug 24, for example.

As described above, in some preferred embodiments, the activated carbon-containing sorbent can be located in one or more hollow portion(s) of the cigarette filter. As shown in FIG. 8, the activated carbon-containing sorbent can be placed in the space of a plug/space/plug filter configuration. As shown in FIGS. 7, 10 and 11, the activated carbon-containing sorbent can be placed in the interior of a hollow sleeve. As described above, the activated carbon-containing sorbent can be constructed to replace the hollow sleeve.

Figure 13:
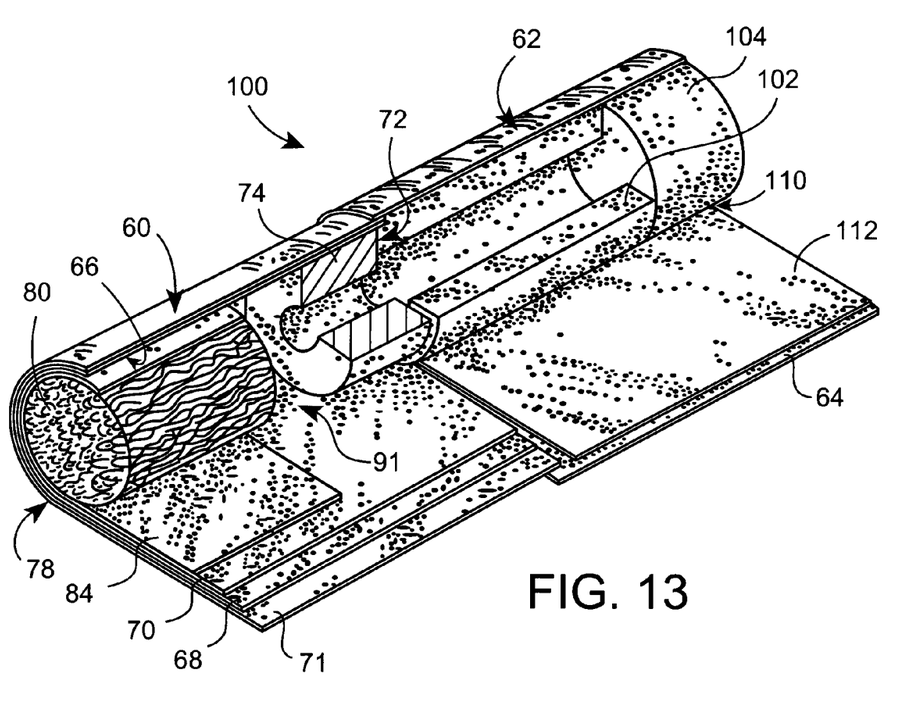
FIG. 13 illustrates a cigarette for an electrical smoking system.

In another embodiment, the activated carbon-containing sorbent is provided in the filter portion of an electrically heated cigarette used with an electrical smoking device as described, for example, in U.S. Pat. No. 5,692,525. FIG. 13 illustrates an embodiment of an electrically heated cigarette 100, which includes a tobacco rod 60 and a filter portion 62 joined by tipping paper 64. The filter portion 62 contains a tubular free-flow filter element 102 and a mouthpiece filter plug 104. The free-flow filter element 102 and mouthpiece filter plug 104 can be joined together as a combined plug 110 with a plug wrap 112. The tobacco rod 60 can have various forms incorporating one or more of an overwrap 71, another tubular free-flow filter element 74, a cylindrical tobacco plug 80 preferably wrapped in a plug wrap 84, a tobacco web 66 comprising a base web 68 and tobacco flavor material 70 and a void 91. At the free end 78 of the tobacco rod 60, the tobacco web 66 together with overwrap 71 are wrapped about a cylindrical tobacco plug 80.

Various modifications can be made to the filter portion 62 to incorporate the activated carbon-containing sorbent at one or more locations of the filter portion 62 of such cigarette 100. For example, the activated carbon-containing sorbent can placed in the passageway of, or in place of, the tubular free-flow filter element 102 and/or the free-flow filter element 74, and/or placed in the void space 91. Further, the filter portion 62 can be modified to create a void space into which activated carbon-containing sorbent can be located.

The amount of the activated carbon-containing sorbent provided in smoking articles can be varied depending on the amount of components in the tobacco smoke and the amount of the components that is desired to be removed from the tobacco smoke. For example, about 10 mg to about 300 mg of the sorbent is typically used in a cigarette. For example, within the usual range, amounts such as about 20, 30, 50, 75, 100, 150, 200, or 250 mg of the activated carbon-containing sorbent can be used in a cigarette. The filter may preferably contain from about 5% to about 90%, and more preferably from about 10% to about 50% by weight, of activated carbon-containing sorbent.

An exemplary embodiment of a method of making a filter comprises incorporating at least one activated carbon-containing sorbent into a cigarette filter, in which the activated carbon-containing sorbent is capable of selectively removing one or more selected gas-phase components from mainstream tobacco smoke. Any conventional or modified method of making cigarette filters may be used to incorporate the activated carbon-containing sorbent in the cigarette.

Embodiments of methods for making cigarettes comprise placing a paper wrapper around a tobacco rod, and attaching a cigarette filter to the tobacco rod to form the cigarette. The cigarette filter contains at least one activated carbon-containing sorbent. As described above, the activated carbon-containing sorbent can optionally be incorporated in the tobacco rod of cigarettes.

Examples of suitable types of tobacco materials that may be used include flue-cured, Burley, Md. or Oriental tobaccos, rare or specialty tobaccos and blends thereof. The tobacco material can be provided in the form of tobacco lamina; processed tobacco materials, such as volume expanded or puffed tobacco, processed tobacco stems, such as cut-rolled or cut-puffed stems, reconstituted tobacco materials, or blends thereof. Tobacco substitutes may also be used.

In cigarette manufacture, the tobacco is normally in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders and the like).

Techniques for cigarette manufacture are known in the art, and may be used to incorporate the activated carbon-containing sorbent. The resulting cigarettes can be manufactured to any desired specification using standard or modified cigarette making techniques and equipment. The cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm, and preferably around 25 mm. The packing density is typically between the range of about 100 mg/cm$^3$ to about 300 mg/cm$^3$, and preferably about 150 mg/cm$^3$ to about 275 mg/cm$^3$.

Other preferred embodiments are provided that relate to methods of smoking a cigarette described above, which involve lighting the cigarette to form smoke and drawing the smoke through the cigarette. During the smoking of the cigarette, the activated carbon-containing sorbent selectively removes one or more selected components from mainstream smoke.

"Smoking" of a cigarette means the heating or combustion of the cigarette to form tobacco smoke. Generally, smoking of a cigarette involves lighting one end of the cigarette and drawing the cigarette smoke through the mouth end of the cigarette, while the tobacco contained in the tobacco rod undergoes a combustion reaction.

However, the cigarette may also be smoked by other means. For example, the cigarette may be smoked by heating the cigarette using an electrical heater, as described, for example, in commonly-assigned U.S. Pat. Nos. 6,053,176; 5,934,289; 5,591,368 or 5,322,075, each of which is incorporated herein by reference in its entirety.

The following Examples illustrate aspects of the invention. The Examples are not meant to and should not be construed to limit the invention in any way.

EXAMPLE 1

Figure 14:
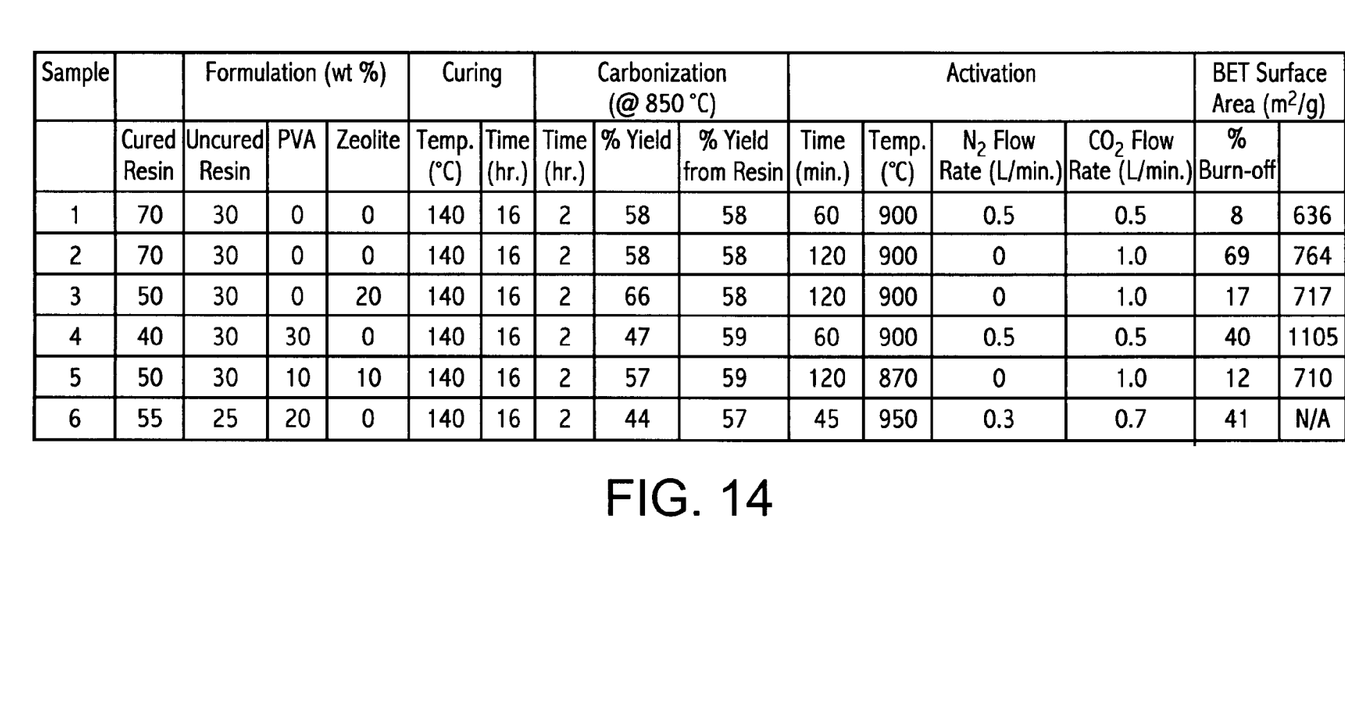
FIG. 14 shows processing conditions and properties of activated carbon-containing sorbents described in Example 1.

Six sample activated carbon-containing sorbents were produced and analyzed. Referring to FIG. 14, Samples 1-6 were each produced using a Resole-type resin (VARCUM 29217, manufactured by Durez Corp., Dallas, Tex.) as both the first resin and the second resin. The first resin was cured in an open atmosphere to form an infusible solid and then milled to reduce the solid to first resin particles. The first resin particles were then mixed with uncured second resin particles to produce a resin mixture. In Sample 3, the resin mixture was mixed with a molecular sieve material (zeolite ZSM-5) in powder form. In Samples 4 and 6, the resin mixture was mixed with a pore-forming substance, polyvinyl alcohol (PVA), at different weight percentages of the mixture components. In Sample 5, the resin mixture was mixed with both PVA and zeolite ZSM-5. Samples 1-6 were placed in separate glass vessels each having a cylindrical shape and cured in an open atmosphere at the same temperature and for the same period of time.

The cured mixtures were then carbonized in an inert atmosphere at a temperature of about 850° C. for 2 hours. As shown in FIG. 14, the "% yield from resin" ranged from 57% to 59%. The "% yield" reflects that the mixtures used in Samples 3-6 included zeolite and/or PVA. The zeolite did not decompose during carbonization, while the PVA was substantially completely decomposed.

Following carbonization, Samples 1-6 were activated in atmospheres using different flow rates of $CO_2$ and $N_2$, and different activation temperatures and times. As shown in FIG. 14, the % burn-off of carbon resulting from activation ranged from 8% for Sample 1 using equal flow rates of $CO_2$ and $N_2$, to 69% for Sample 2 using only $CO_2$. The BET surface area was measured following activation. The BET surface area was lowest for Sample 1 produced without using PVA, and highest for Sample 4 produced using 30 wt % PVA in the mixture.

EXAMPLE 2

Figure 15:
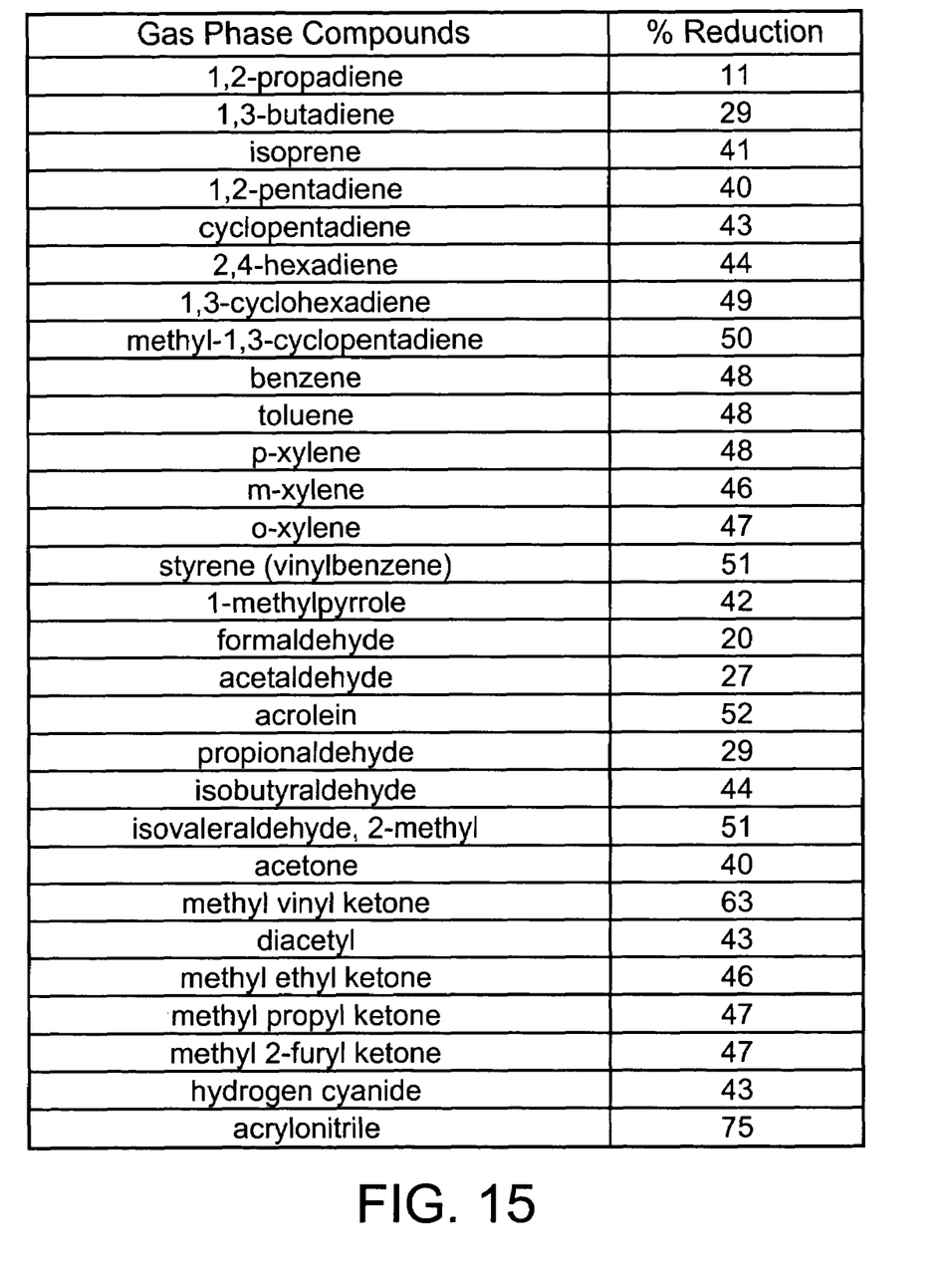
FIG. 15 shows the difference in percent of components removed from mainstream tobacco smoke by a modified standard cigarette including an activated carbon-containing sorbent as compared to an unmodified standard cigarette described in Example 2.

The activated carbon-containing sorbent produced as in Sample 6 was used to modify two Industry Standard (IR4F) cigarettes. Sample 6 was in disk form and had a diameter of about 8 mm and a length of about 3 mm and a mass of about 50 mg. For both modified cigarettes, a portion of the cellulose acetate filter material was removed from the standard cigarette and the activated carbon-containing sorbent produced in Sample 6 was placed in the filter of the IR4F cigarette. The two modified cigarettes and two unmodified IM-16 cigarettes were smoked under FTC conditions. The fourth puff of each cigarette was analyzed using gas chromatography-mass spectroscopy (GC-MS). For the modified and unmodified cigarettes, the delivered amount of various gas phase smoke components listed in FIG. 15 were determined. The measured amounts of the components delivered were averaged for the two modified and two unmodified cigarettes. For each compound, the percent difference between the average amount of the compound delivered by the unmodified cigarettes and the average amount of the same compound delivered by the modified cigarettes was determined. The results demonstrate that the modified cigarettes containing the activated carbon-containing sorbent delivered significantly less of each compound than the unmodified cigarettes and thus were significantly more efficient than the unmodified cigarettes including only a cellulose acetate filter element. The test results demonstrate that cigarette filters containing the activated carbon-containing sorbent can selectively remove selected components from mainstream smoke.

Preferred embodiments of the activated carbon-containing sorbent have been described above with respect to use in smoking articles to remove components from mainstream tobacco smoke. However, the activated carbon-containing sorbent can be used in other applications in which the selective removal of gaseous components from a gas flow is desired. For example, it can be used in catalyst adsorption, treatment of waste flows containing undesirable gases and/or vapors, air filtration, vehicle exhaust filtration and deodorization processes.

While the invention has been described in detail with reference to preferred embodiments thereof, it will be apparent to one skilled in the art that various changes can be made, and equivalents employed, without departing from the scope of the invention.

What is claimed is:

1. A method of making an activated carbon-containing sorbent, comprising:
   curing a first resin;
   comminuting the cured first resin into first cured resin particles;
   mixing the first cured resin particles with uncured second resin particles to produce a mixture wherein the mixing further comprises mixing the first resin particles and the uncured second resin with at least one molecular sieve material to produce the mixture;
   curing the second resin particles to form a cured mixture;
   carbonizing the cured mixture to produce a carbonized body; and
   activating the carbonized body to produce an activated carbon-containing sorbent.

2. The method of claim 1, wherein the first resin and the second resin are a phenolic resin.

3. The method of claim 1, wherein the first resin and the second resin are solid particles and have the same composition.

4. The method of claim 1, wherein the second resin is in particle form, and the first resin particles and the second resin particles have approximately the same average particle size and/or particle size distribution.

5. The method of claim 1, wherein the mixture has a weight ratio of the first resin to the second resin of about 80:20 to about 60:40.

6. The method of claim 1, wherein the cured first resin is a solid mass comminuted into the first cured resin particles by mechanical impaction.

7. The method of claim 1, wherein the first resin is cured at a first temperature and the second resin particles are cured at a second temperature lower than the first temperature.

8. The method of claim 1, further comprising shaping the mixture into a selected shape prior to curing the mixture, wherein the cured mixture has substantially the selected shape.

9. The method of claim 1, wherein the activated carbon-containing sorbent has an average pore size less than 15 Å.

10. The method of claim 1, wherein the activated carbon-containing sorbent is a cylindrical monolith.

11. The method of claim 1, wherein the activated carbon-containing sorbent has a BET surface area of from about 500 $m^2/g$ to about 1,500 $m^2/g$.

12. The method of claim 1, wherein the activated carbon-containing sorbent consists essentially of activated carbon and the at least one molecular sieve material.

13. The method of claim 1, wherein:
   the mixing further comprises mixing the first resin particles and the uncured second resin with at least one pore-forming substance to produce the mixture; and
   the activating further comprises removing substantially all of the pore-forming substance from the carbonized body by evaporation thereby producing pores in the activated carbon-containing sorbent.

14. The method of claim 13, wherein the at least one pore-forming substance is poly(vinylalcohol) and/or polypropylene.

15. The method of claim 13, wherein the at least one molecular sieve material includes a zeolite, and the at least one pore-forming substance is poly(vinylalcohol) and/or polypropylene.

16. A method of making a cigarette filter, comprising:
   making at least one activated carbon-containing monolithic sorbent by the method according to claim 13; and
   incorporating in a filter the at least one activated carbon-containing monolithic sorbent.

* * * * *